July 14, 1931. J. BETHENOD 1,813,908
HIGH SPEED RADIOTELEGRAPHIC RECEIVING APPARATUS
Filed July 1, 1927 2 Sheets-Sheet 1

INVENTOR
JOSEPH BETHENOD
BY
ATTORNEY

July 14, 1931.  J. BETHENOD  1,813,908
HIGH SPEED RADIOTELEGRAPHIC RECEIVING APPARATUS
Filed July 1, 1927   2 Sheets-Sheet 2

INVENTOR
JOSEPH BETHENOD
BY
ATTORNEY

Patented July 14, 1931

1,813,908

UNITED STATES PATENT OFFICE

JOSEPH BETHENOD, OF PARIS, FRANCE

HIGH SPEED RADIOTELEGRAPHIC RECEIVING APPARATUS

Application filed July 1, 1927, Serial No. 202,826, and in France July 8, 1926.

Radio transmitter systems are known whereby a great number of signals of the Morse or other equivalent codes can be sent out per second, and these systems are particularly useful in connection with the employment of very short waves. Also for the receiving end, apparatus are known whereby these signals can be recorded with any desired speed. But when an attempt is made to translate them automatically into ordinary printed characters, one serious difficulty is encountered which is due to the fact that the maximum speed of operation of translating apparatus of the kind now known falls way below the speed attainable by both the receiver and the transmitter apparatus worked with the Morse code or the like. In the case of radio-telegraphic communication the great advantage residing in and offered by a very high keying speed is thus lost.

Now, the present invention has as its object means adapted to feed a plurality of translators from a single receiver apparatus capable of recording the signals sent out at maximum rates of speed.

Fundamentally speaking, the same consists in recording Morse or equivalent signals by the aid of electromagnetic phonographs or telegraphones of the kind evolved, for instance, by Poulsen, rendered operative successively according to the following cycle which is applied to each recorder and which comprises three periods, to wit.

(1) The recording work proceeds at a convenient rate of speed, the recording electromagnet which acts upon the magnetizable wire (or band) being connected with the aerial receiving wire by means of convenient apparatus (amplifiers, detectors, relays, etc.).

(2) Once the wire corresponding to the recorder just in operation is completely filled with an impression, or nearly so, an automatic device is provided for the object of changing over the recording to a second telegraphone (or similar apparatus) and connecting the electromagnet of the first with a translator of any desired type. By passing the magnetized wire opposite this electromagnet, the same now becomes a generator and it is thus rendered able to actuate the translator, if desired, with the intermediary of amplifiers or relays of suitable design.

According to another feature of the present invention, the rate of travel of the wire is retarded during this new period so as to adapt it to the rate of operation of the translator, in such a way that the difficulty above pointed out is entirely surmounted.

(3) Once the repeater operation has been completed, the magnetized wire is made to travel a third complete course, if desired, at a high rate of speed so as to avoid all loss of time. During this travel, it is entirely de-energized by the action of a constant magnetic field which may be produced by feeding the electromagnet with current from a direct current source. After this operation has been completed, the wire is ready for another cycle.

Figure 1 shows diagrammatically a receiver located adjacent a recording medium, a switching arrangement connected with said recording device and driving means associated with said recording medium, while;

Figure 1:
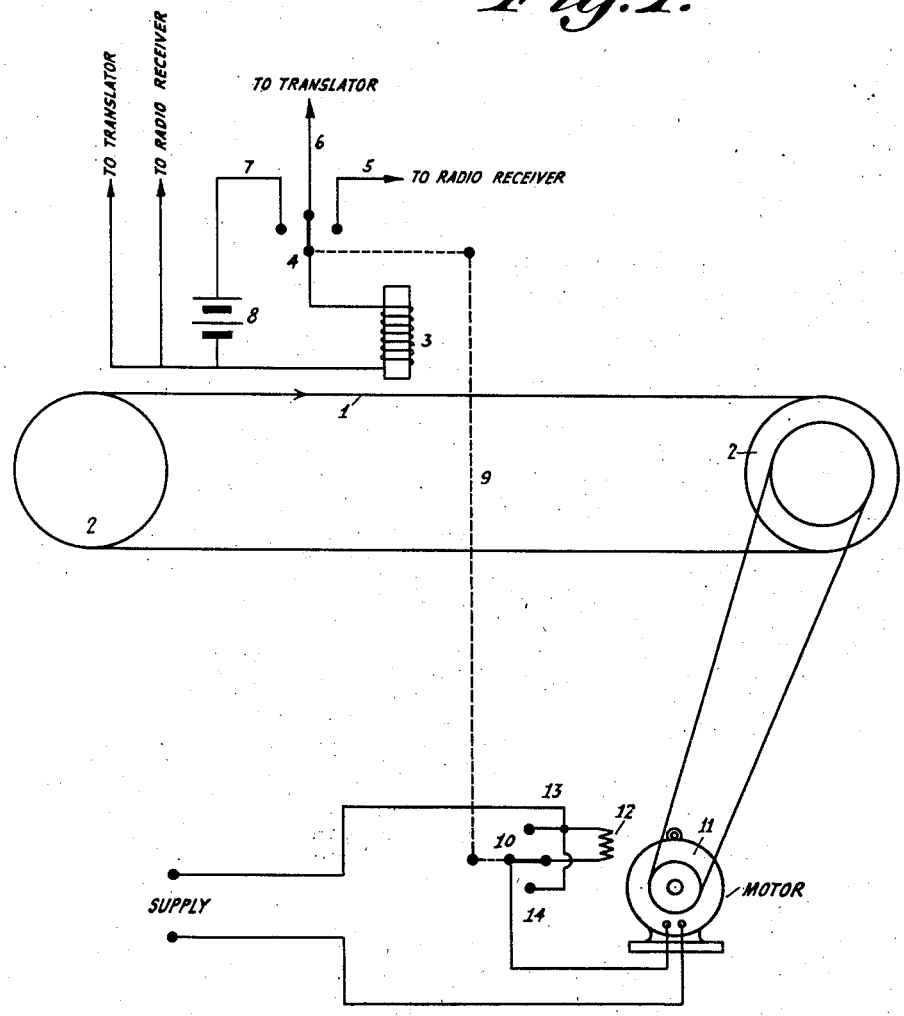

It will be seen that by combining a certain number of electromagnetic phonographs operated in a cycle, the recording of signals in ordinary printed characters can be insured in an uninterrupted manner. For instance, by six such telegraphones it is possible to feed four printing translators of the usual type by means of a single receiver apparatus, with the latter recording four times as many words per minute as the printing apparatus in question. By limiting the magnetic inscription to five seconds, the reproduction at reduced speed to twenty seconds, and by effecting de-magnetization in five seconds, it will thus be seen that it is practically possible to utilize a magnetizable endless wire 1 (Figure 1) supported by pulleys 2, 2. The electromagnet is diagrammatically indicated at 3. A switch 4 is adapted to establish connection either at 5 with the radio receiver apparatus, or at 6 with the translator or else at 7 with the source 8 provided to produce demagnetization (third or last stage of the cycle). The switch 4 should be coupled mechanically by the rod 9 with a second switch 10 the object of which is to vary the speed of the motor 11 according to the particular stage of the working cycle. For instance, by the agency of this switch which acts by any convenient means upon the speed, the latter is reduced while the switch 4 is placed upon contact 6, whereas it is raised to a higher value when the switch is placed upon contacts 5 or 7.

The operation of the switches 4 and 10 may be effected automatically by any convenient means at all, provided that the wire 1 has completed or nearly completed a full rotation about the pulleys 2, 2. It will be understood that small overlaps amounting generally to only a fraction of a second could be provided between the apparatus so as to avoid all loss of text on changing from one period or stage to another.

On basis of the figures above cited by way of example, each magnetizable wire would be re-used every half-minute, but so far as the operation of the printers is concerned, these would be worked without interruption.

It will be evident that a great number of variations and modifications are possible, without departing from the spirit of the invention. For instance, magnetizable disks could be employed in lieu of endless wires or tapes, etc.

Figure 2:
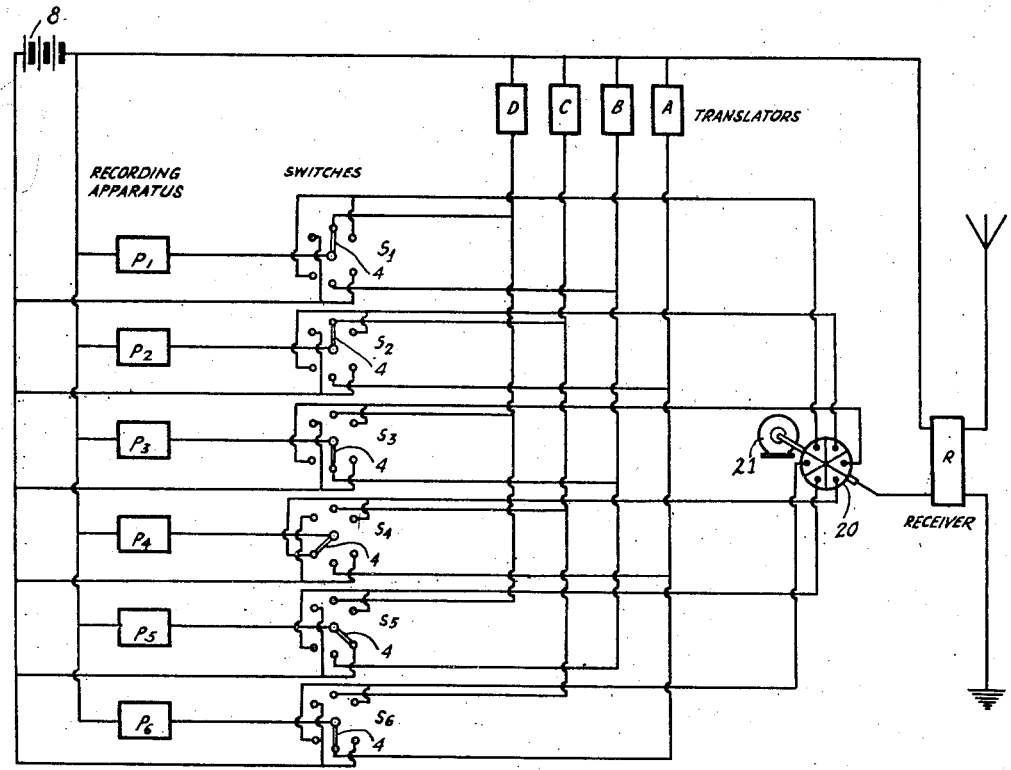
Figure 2 shows diagrammatically a plurality of translators and recording devices associated with switches and a receiver for high speed recording.

A better understanding of the receiving apparatus will be had by reference to Figure 2 of the drawings, in which a system involving the use of a single receiver, 4 translators and 6 recording or magnetic recording devices is shown diagrammatically, merely for purposes of illustration. In the embodiment shown in Figure 2 for purposes of illustration the translators A, B, C and D are adapted to be connected through switches $S_1$, $S_2$, $S_3$, $S_4$, $S_5$ and $S_6$ to recording magnets or telegraphones $P_1$, $P_2$, $P_3$, $P_4$, $P_5$ and $P_6$ in the proper sequence as will be pointed out more in detail hereafter. The telegraphones are influenced by the magnetic signals on the tapes and said signals are translated by translators A, B, C and D.

A source of energy 8 is shown connected at one pole directly to translators A, B, C, D, receiver R and to telegraphones $P_1$, etc., on the one hand and through switches $S_1$, etc., and the rotating switch 20 driven by motor 21 to the translators A, B, C, D, and receiver R and recording devices $P_1$, etc., on the other hand, as will appear more in detail hereafter.

In Figure 2 the position taken by each of the switches at one stage in the operation of the device is shown. In determining this position it is supposed that, as pointed out above in connection with Figure 1, the length of time that a translator is connected to a telegraphone is four times as long as the time during which a telegraphone is connected to a receiver. As indicated above, these time durations have been taken as 20 seconds and 5 seconds respectively. The time taken to demagnetize the strip after the message thereon has been translated has been taken, as indicated above, as 5 seconds. On the basis of this 6 telegraphones have been shown as cooperating with a single receiver and 4 translators through 6 switches.

The operating cycle may be divided in the 12 phases, using phases as meaning different switch positions. During each phase 4 telegraphones are connected with the translators A, B, C, D, one telegraphone is connected to the receiver and one to the battery for demagnetizing the strip.

In the illustration tanslators A, B, C and D are shown connected through switches $S_6$, $S_3$, $S_2$, $S_1$ respectively with telegraphones $P_6$, $P_3$, $P_2$, $P_1$ respectively. The telegraphone $P_4$ is shown as being connected through switch 4, switch 20 to receiver R, while telegraphone $P_5$ is shown connected through switch $S_5$ directly across the battery A to demagnetize the strip.

As pointed out above, 4 telegraphones are connected to the 4 translators simultaneously and remain in operation during 4 switch positions or phases. During each phase 4 switches are in the vertical position and 2 are in the sloping position, as shown in Figure 2. Once having assumed the vertical position each of the switches stays in the vertical position for 4 phases. A switch stays in the sloping position only a single phase. Three switches change in position cyclicly by advancing counterclockwise 60°. After the first phase, as illustrated in Figure 2, switches $S_4$, $S_5$ and $S_6$ move counterclockwise 60°. After the second phase, switches $S_5$, $S_6$ and $S^1$ move counterclockwise through 60°, and after the third phase switches $S_6$, $S_1$ and $S_2$ move counterclockwise through a 60° angle. This operation is repeated until on the 13th change all of the switches return to the original position. As the operation of the device will be apparent from the above description, it is thought unnecessary to set forth each of the 12 different positions taken by $S_1$, $S_2$, etc. It follows, therefore, that these switches could not be driven directly from a single motor in view of the fact that the speed of rotation of the various switches is not uniform and that certain switches stop periodically twice during each revolution and the travel of all of the switches is not the same nor simultaneous. However, an arrangement could be readily provided whereby a single motor would indirectly drive all of the switches in the desired manner. The details of such an arrangement, however, form no part of the present invention. During the 12 phases described above the rotary switch of the receiver, which is divided into 12 sectors, turns twice so that a change in sector means a change in phase as described above.

Having thus described my invention, I claim:

1. The method of receiving high speed signals by means of a plurality of recording devices, such as, electromagnetic phonographs or telegraphones, which consist in momentarily and periodically recording by each device a portion of the received signals during one cycle, causing said recording devices to successively actuate printing apparatus during another cycle, and then allowing the recording devices to become de-magnetized during a third cycle, the three cycles being repeated in a continuing sequence.

2. The method of receiving high speed signals by means of a plurality of recording devices, such as, electromagnetic phonographs or telegraphones, which consist in momentarily and periodically recording by each device a portion of the received signals at a high speed during one cycle, causing said recording devices to successively actuate printing apparatus at an increased speed during another cycle, and then allowing the recording devices to become demagnetized at an increased speed during a third cycle, the three cycles being repeated in a continuing sequence.

3. High-speed radio-telegraphic receiving apparatus comprising a single receiver, a plurality of telegraphones associated therewith for recording the signals at a constant speed, and a plurality of printing translators fed from said telegraphones at a different speed.

4. High-speed radio-telegraphic receiving apparatus comprising a single receiver, a plurality of telegraphones associated therewith for recording the signals at constant speed during the entire operating time of the signal receiver, a plurality of printing translators fed from said telegraphones, and means for automatically adjusting the recording speed of the telegraphones and the speed of the translators.

5. High-speed radio-telegraphic receiving apparatus comprising a single receiver, a plurality of telegraphones associated therewith for recording the signals at constant speed during the entire operating time of the signal receiver, a plurality of printing translators, each periodically fed from one of the telegraphones, and switching means for automatically adjusting the recording speed of the telegraphones at a higher speed than that of the printing translators.

6. Apparatus for the translation in printed characters of telegraphic signals received at high speed without interruption of operation, comprising in combination with a telegraphic or radio-telegraphic receiver, of several high speed telegraphone recorders, means for successively and periodically connecting the receiver with said recorders, a plurality of translators and printing apparatus arranged to be successively and periodically connected to said recorders, and means for obliterating the signals after they have been translated and printed, said means being associated with means for varying the speed of said recorders.

7. Apparatus for the translation in printed characters of telegraphic signals received at high speed without interruption of operation, comprising in combination with a telegraphic or radio-telegraphic receiver, of several high speed telegraphone recorders, switching means for periodically and successively connecting the receiver therewith, each recorder being provided with a tape or band magnetized in accordance with the received signals, a motor for driving said magnetized tapes or bands, several translators and printers and a direct current source associated with said recorders, and second switching means for successively connecting each recorder with the receiver, each receiver with a translator and printer, and then with the direct current source, and means associated with said second switching means for regulating the speed of the motors driving the tapes or bands.

8. In a system for transformation into printed characters signals received with great speed without the stopping of the operation of the transforming apparatus, a plurality of rapid translating devices certain ones of which are connected with the signal receiver for recording the message, while others are at the same time subject to the action of means destroying the recorded message, and still others are simultaneously linked to the transforming apparatus, the ratio of the number of devices of this last group to the number of recording devices connected to the receiver being equal to the ratio of the recording speeds to the transforming speeds, and switching means for connecting each device successively to the receiver, the transformer and to the means destroying the message in such manner that the recording and transforming speeds will remain constant during the entire operating time of the signal receiver.

9. A high speed telegraphic apparatus comprising a single receiver, a plurality of telegraphones associated therewith for recording signals at a contant speed during the entire operating time of the receiver, a plurality of printing translators fed from said telegraphones, and means for operating said translators at a speed equal to the ratio between the number of recording telegraphones and the number of transmitters times the speed of the recording telegraphones.

10. A high speed radio telegraphic receiving apparatus comprising a single receiver, recording means, a plurality of telegraphones associated therewith and with said receiving means for recording signals at a constant speed, a plurality of printing translators fed from said telegraphones to translate said signals at a lower speed, and a plurality of demagnetizing devices associated with said recording means and operated at a speed equal to the speed of the recording devices.

JOSEPH BETHENOD.